United States Patent [19]

Rawlinson

[11] Patent Number: 5,100,093
[45] Date of Patent: Mar. 31, 1992

[54] REAR VIEW MIRROR MOUNTING ARRANGEMENT FOR BOATS

[76] Inventor: Steven E. Rawlinson, 2224 Morley St., Simi Valley, Calif. 93065

[21] Appl. No.: 656,844

[22] Filed: Feb. 19, 1991

[51] Int. Cl.⁵ ............................................. A47G 1/24
[52] U.S. Cl. .................................. 248/480; 248/279; 248/481
[58] Field of Search ..................... 248/475.1, 476, 477, 248/479, 480, 481, 482, 484, 485, 486, 279, 283, 288.3, 295; 403/90, 131, 122; 350/631

[56] References Cited

U.S. PATENT DOCUMENTS

| | | | |
|---|---|---|---|
| 1,403,863 | 1/1922 | Peat | 248/279 X |
| 2,473,698 | 6/1949 | Aves | 248/482 |
| 2,861,501 | 11/1958 | Strelakos | 248/482 X |
| 3,627,244 | 12/1971 | Nicholas | 248/279 X |
| 4,623,115 | 11/1986 | Brester | 248/479 |
| 4,738,519 | 4/1988 | Stewart | 248/475.1 X |
| 4,995,581 | 2/1991 | Kowai et al. | 248/480 |

OTHER PUBLICATIONS

Water Sport Illustrated 1990 (p. 42).

*Primary Examiner*—Ramon O. Ramirez
*Attorney, Agent, or Firm*—Noel B. Hammond; Kenneth W. Float

[57] ABSTRACT

A U-shaped clamp fastens to a boat windshield frame with set screws and incorporates a protruding member having a recess with a hemispherical radius at the inner end and a straight bore tapped with internal threads at the outer end. A ball having a matching radius is held captive in the recess by a nut that engages the internal threads. The nut has a partial radius that matches the radius of the ball. A slotted elongated arm fastens to a mirror at the slotted end, and has an elbow at the other end that passes through a large opening in the nut and fastens to the ball. Another embodiment has a ball mounted on the protruding member that mates with a cylindrical ball socket member having a ledge at one end adapted to engage the ball. The ball socket member has a split that is squeezed together to hold the ball. Another embodiment has a cylindrical pivot member rather than a ball-socket pivot. In one embodiment the protruding member is formed as an integral part of the boat windshield frame. The multi-axis pivoting arrangement adapts to a wide variety of windshield shapes and permits pivoting the mirror down and out of the way when not in use to permit covering and trailering of the boat.

5 Claims, 7 Drawing Sheets

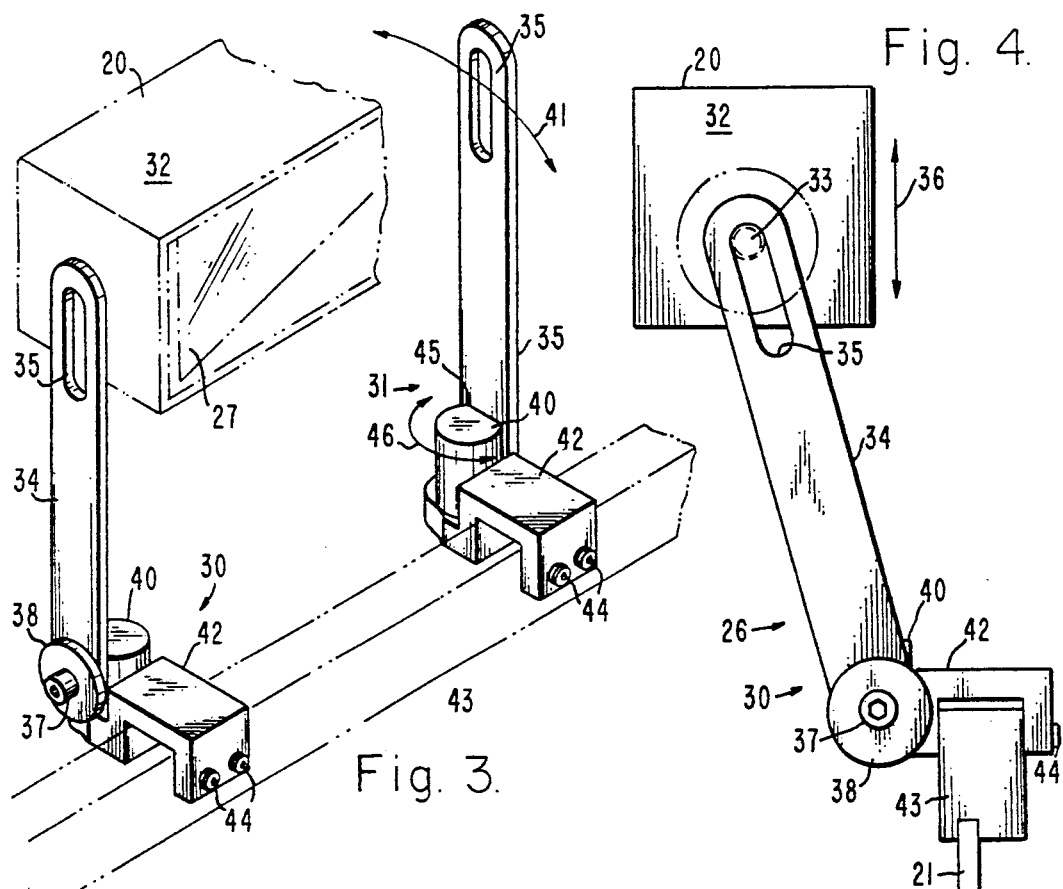
Fig. 4.
Fig. 3.
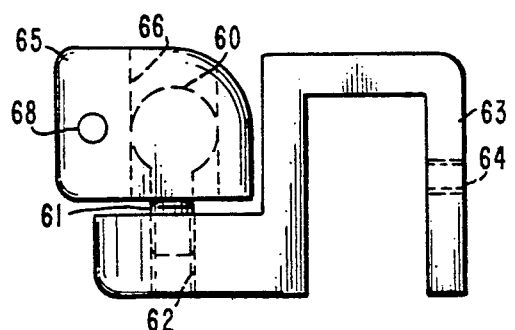
Fig. 6.
Fig. 7.
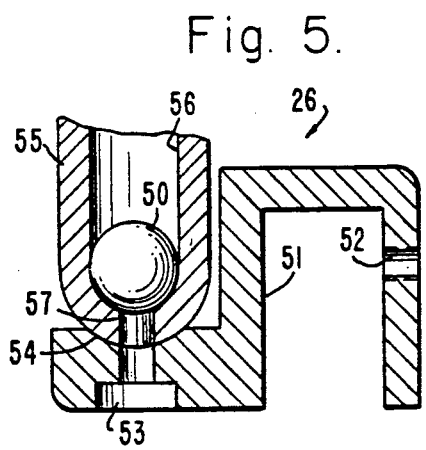
Fig. 5.

REAR VIEW MIRROR MOUNTING ARRANGEMENT FOR BOATS

BACKGROUND

The present invention relates to the field of water sports, and, more particularly, to a mirror arrangement that provides an unobstructed view of a water skier being towed behind a speedboat.

One of the popular water sports is water skiing. In that sport, a person wearing water skis and holding onto a tow rope is towed behind a speeding ski boat. The driver of the ski boat needs to have a constant view of the skier and, at the same time, needs to be able to keep his eyes on water traffic ahead. For one thing, the driver needs to know if the skier is in trouble for safety reasons. The driver also needs to critique the performance of the skier so that the skier can improve his technique. In competition, the driver helps the skier perform. For example, in the slalom, the driver must steer a course between buoys while at the same time helping the skier to negotiate the slalom course. Thus, mirrors have become one of the most important accessories for ski boats.

Typically, a stock ski boat comes equipped with a mirror having a length and width of about eight by five inches. The stock mirror is conventionally mounted to the deck or cowl forward of and to one side of the driver. The mirror is typically no higher than the instruments mounted in the instrument panel.

The stock mirror arrangement is suitable for most purposes. But when there is a passenger in the boat, the driver's view of a skier being towed behind the boat is frequently obscured. In an attempt to solve this problem, accessory mirrors are made available that fasten to the windshield post and extend out to one side of the windshield, either to port or starboard, or that mount to the top of the windshield and extend down toward the driver of the boat. These accessory mirrors are an improvement over stock mirrors but do not completely solve the problem of providing an unobstructed view of the skier behind the boat when passengers are aboard.

At least one water sport enthusiast mounted a 36 inch long mirror designed for cars and trucks to his boat. See the photograph on page 42 of "Watersport Illustrated 1990". The mirror is sold as the Wink Safety Mirror by the Wink Corporation, 5631 208th St. S.W., Lynnwood, Wash. 98036. However, the mirror is bolted to the top of the windshield frame using the stock hardware supplied with the mirror. Consequently, the mirror is located down into the cockpit where the view is subject to being blocked by the heads of passengers.

Accordingly, there has been a need for a boat mirror that provides a panoramic view unobstructed by passengers in the boat. A boat mirror satisfying those requirements should also be adaptable to various windshield shapes and should pivot up and down, depending upon whether it is stowed, or in use. It is also an objective that the mirror be made with a flat surface that produces no distortion of the image.

SUMMARY OF THE INVENTION

In accordance with the foregoing and other objectives and features of the invention, there is provided an arrangement for mounting an elongated, relatively narrow, mirror above the windshield of a ski boat. Typically, the mirror is made of flat, distortion-free segments, although a convex mirror may be used, if desired. The mirror mounting arrangement of the present invention provides a panoramic view that is unobstructed by passengers of activities taking place behind the boat. The mirror mounting arrangement is provided with a multi-axis pivot that adapts to a wide variety of windshield shapes, and that permits pivoting the mirror down and out of the way when it is not in use. This feature permits covering and trailering of the boat. In accordance with the principles of the present invention, an existing commercially available mirror such as the Wink Safety Mirror, or the like, is adapted to mount above the windshield of a boat by means of a special mounting arrangement. This special mounting arrangement has an elongated slot member to which the mirror attaches, and which is adjustable by placement in the slot. The mounting arrangement may be made integral with the windshield frame, or may employ a special U-shaped clamp that is adapted to attach to the windshield frame of the boat, where it is secured by means of set screws. The mounting arrangement includes a multi-axis pivot that adjusts to the angle of the windshield of any given boat. The multi-axis pivot may be either cylindrical or spherical. The length of the mirror is preselected to adapt to the style of windshield used on the boat, and typically comprises three or five mirror sections or panels.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a perspective view of a broken-away fragment of the mirror of FIGS. 1 and 2 showing details of a first embodiment of a mounting arrangement in accordance with the invention;

FIG. 4 is a side elevation view of the mirror and mounting arrangement of FIG. 3;

FIG. 5 is a broken away side view in cross section of a second embodiment of a mounting arrangement employing a ball and socket pivot assembly;

FIG. 6 is a top view of a third embodiment of a mounting arrangement employing a split ball socket member;

FIG. 7 is a side view of the ball and socket pivot assembly of FIG. 6;

DETAILED DESCRIPTION

Figure 1:
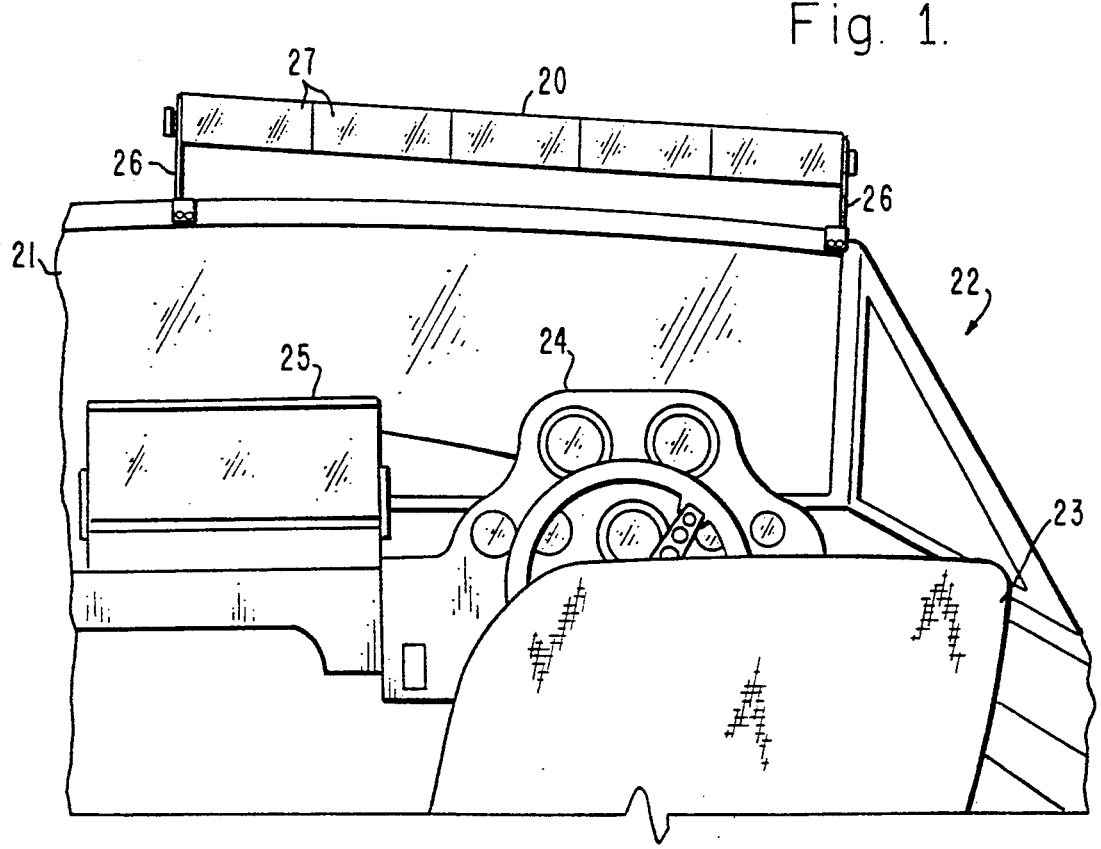
FIG. 1 is a perspective view of a mirror mounted in accordance with the invention on the windshield of a boat.
Figure 2:
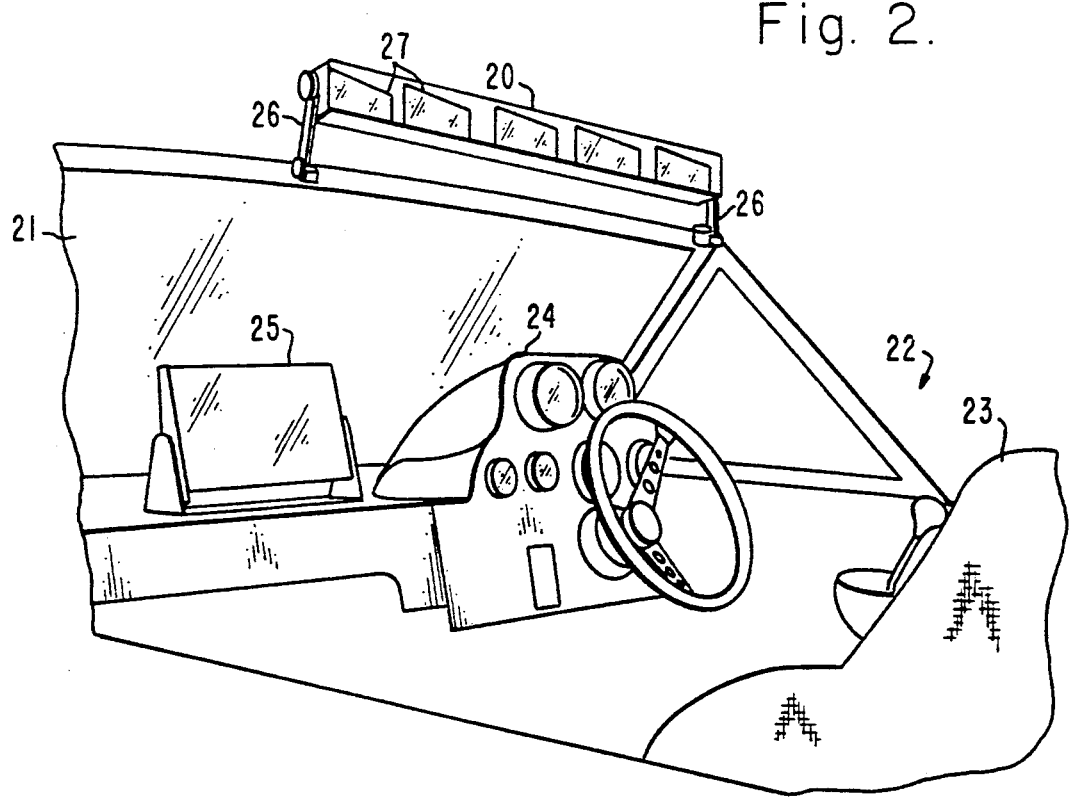
FIG. 2 is a view from another perspective of the mirror of FIG. 1.

Referring now to the drawings, FIGS. 1 and 2 show a mirror 20 mounted in accordance with the invention to a windshield 21 on a boat 22. FIG. 1 is a perspective view taken from behind a driver's seat 23 looking in a forward direction through the windshield 21. In front of the driver's seat 23 there is disposed an instrument panel 24, and to the left, is mounted a stock mirror 25 provided as original equipment on the boat 22. It will be noted that the stock mirror 25 has dimensions of about eight by five inches and is mounted to the cowl of the boat 22. It will be noted that the stock mirror 25 is no higher than the instrument panel 24. In that position, the stock mirror 25 is blocked at least some of the time when passengers are in the boat 22. This situation is more apparent in the perspective view of FIG. 2 which is a view of the same boat 22 as shown in FIG. 1, but taken from a different perspective.

To overcome the problems with the stock mirror 25, the mirror 20 of the present invention is added to the boat 22. It is a feature of the present invention that the added mirror 20 is mounted to the frame of the windshield 21 using a special mounting arrangement 26. As will be more fully explained hereinafter, the special mounting arrangement 26 may be made integral with the frame of the windshield 21, or alternatively, may be adapted to clamp to the windshield 21. With this mounting arrangement 26, the mirror 20 is adapted to extend above the windshield 21 by several inches. This location provides a panoramic and unobstructed view of a water skier being towed behind the boat 22 or of other boats that may be followed during a skiing exercise.

The mirror 20 is made by combining a plurality of sections or panels of individual mirrors 27 into one elongated mirror 20, in this example, five individual mirrors 27. The individual mirrors 27 are preferably flat, rather than curved, and preferably made of silvered glass rather than some other reflective material. This provides an undistorted view of the skier being towed. However, the mirror may be convex if required to provide a wider field of view. If desired, the mirror 20 may be an existing commercially available mirror such as the Wink Safety Mirror made and sold by the Wink Corporation of Lynnwood, Wash. Each of the individual mirrors 27 is typically about 6¾ inches long and about 2 inches wide. It may be found desirable to construct a mirror 20 having individual mirrors 27 a little wider, for example, 3 inches wide. The individual mirrors 27 are each canted at an angle of about 20 degrees. For some models of boat 22 it might be desirable to use a shorter mirror 20 having only three or four individual mirrors 27. This is because some boats 22 are configured to have a separate right and left windshield 21, with an opening therebetween. Some boats 22 have two flat segments forming an angled windshield 21, while other boats 22 have a windshield with a pronounced slope. However, by making the mounting arrangement 26 of a universal design, it is possible to accommodate all models of boats 22.

FIGS. 3 and 4 show a first embodiment of a clamp-type mounting arrangement 26 for the mirror 20. FIG. 3 is a perspective view showing a broken-away fragment of the mirror 20 disposed between left and right holding fixtures 30, 31. FIG. 4 is a side elevation view of the mirror 20 and the left holding fixture 30. The mirror 20 comprises a hollow rectangular plastic frame 32 in which is mounted one or more of the canted, flat individual mirrors 27. At each end of the rectangular plastic frame 32 there is provided a protruding threaded stud 33 (FIG. 4). For clarity, the stud 33 is not shown in FIG. 3.

An arm 34 having an elongated slot 35 is mounted to each end of the mirror 20 by placing the stud 33 through the slot 35, as best seen in FIG. 4. A threaded fastener (not shown) that is sold with the mirror 20 fastens each of the arms 34 to the mirror 20. As indicated by a first arrow 36 in FIG. 4, the slot 35 permits adjusting the mirror 20 up and down. The lower end of the arm 34 is fastened by means of a cap screw 37 and washer 38 to a cylindrical pivot 40. By loosening the screw 37, the arm 34 is enabled to pivot as shown by a second arrow 41 seen in FIG. 3.

A special U-shaped mounting bracket or clamp 42 is provided that clamps to an upper windshield frame member 43 by means of set screws 44. The pivot 40 has a threaded hole (not shown) in the bottom, and the pivot 40 is mounted to the clamp 42 by means of a screw (not shown) that passes through a hole in the clamp 42 and engages the threads in the threaded hole in the bottom of the pivot 40. The pivot 40 is generally cylindrical, but has a flattened surface 45 disposed adjacent the arm 34. When the screw in the bottom of the pivot 40 is loosened, the pivot 40 and the arm 34 are adjustable about the vertical axis as indicated by a third arrow 46 shown in FIG. 3.

The arm 34, pivot 40 and clamp 42 may be made of a metal such as aluminum or stainless steel, for example, or alternatively, they may be made of a hard plastic such as polycarbonate. If aluminum is used, it should be treated against oxidation such as by anodizing. Since the mirror mounting arrangement 26 is for use on a boat 22, the hardware such as the screws 37, washers 38 and set screws 44 are preferably made of a metal such as stainless steel or brass in order to avoid problems with corrosion. If hard plastic is used for the parts, threaded helicoil inserts may be used for threaded holes. It will be noted that because of the adjustability indicated by the first, second and third arrows 36, 41, 46, the mirror 20 may be adjusted to fit any boat 22, and the mirror 20 may be folded down or stowed out of the way when not in use to permit putting a cover on the boat 22, and to permit trailering the boat 22.

Referring now to FIG. 5, there is shown another embodiment of a mounting arrangement 26 employing a spherical ball 50. FIG. 5 is a broken away side view in cross section. A clamp 51 is provided with one or more screw holes 52 for mounting to a windshield frame. The clamp 51 is also provided with a counterbored clearance hole 53 to accommodate a cap screw for attaching to the ball 50 by means of a threaded hole therein. The clamp 51 is also provided with a concave depression 54 to accommodate the rounded end of a ball socket member 55. The ball socket member 55 is provided with a hollow interior cylindrical ball socket 56 having a rounded bottom against which the ball 50 seats. A slotted opening 57 is provided in the ball socket member 55 to permit the ball 50 to receive the cap screw that holds the assembly together. It will be understood that the broken away portion of the ball socket member extends on upward and attaches to one side of a mirror similar to the mirror 20 shown in FIGS. 3 and 4. It will also be understood that a second ball and socket assembly attaches to the other side of the mirror. The ball 50 allows the clamps 51 to adapt to all windshields on the market. The ball 50 is necessary because most windshields have compound angles. One of the features of the mounting arrangement 26 of the present invention is that it permits the mirror to pivot up for use and back down for covering and trailering the boat. The multi-axis pivot embodied in the ball 50 permits the mirror to move up and down without any binding forces. The ball 50, clamp 51 and ball socket member 55 may be made of a metal such as stainless steel or aluminum, or a hard plastic such as polycarbonate.

FIGS. 6 and 7 show another embodiment of a mounting arrangement 26. FIG. 6 is a top view and FIG. 7 is a side view. This embodiment employs a partial ball having a threaded shank 61. Typically, the threads on the shank 61 are ¼—20 threads. A ¼—20 threaded hole 62 is provided in a clamp 63. The clamp 63 is adapted to mount to a windshield frame and is provided with threaded holes 64 for set screws. A ball socket member 65 has a cylindrical ball socket 66 that is adapted to slide down over the ball 60. The ball socket member is provided with a split 67 that permits a clamping action on the ball 60. A hole 68 is provided for a screw that provides clamping action by drawing the split 67 together. The hole 68 is a clearance hole on one side of the split 67. The same hole 68 may also be used to mount a slot member similar to the arm 34 shown in FIGS. 3 and 4. It will be understood that the slot member attaches to one side of a mirror and that a second similar assembly attaches to the other side of the mirror.

Figure 8:
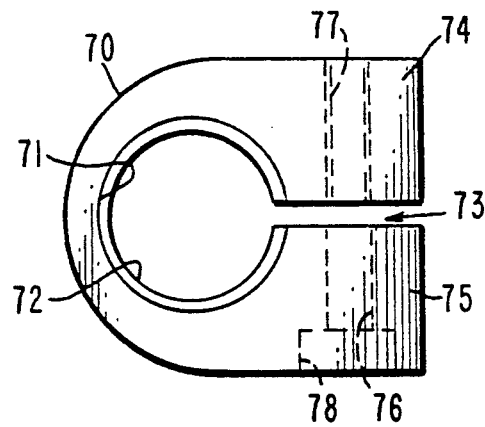
FIG. 8 is a top view of a modified split ball socket member that may be used in the ball and socket pivot assembly of FIGS. 6 and 7.
Figure 9:
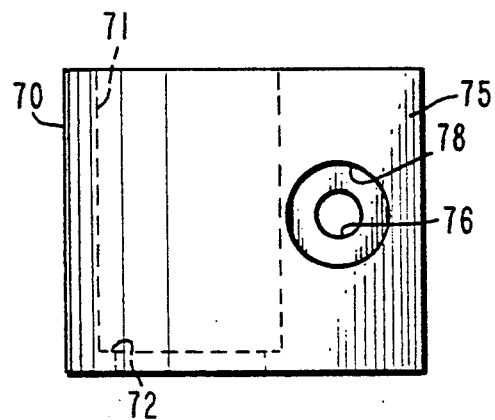
FIG. 9 is a side view of the modified split ball socket member shown in FIG. 8.
Figure 10:
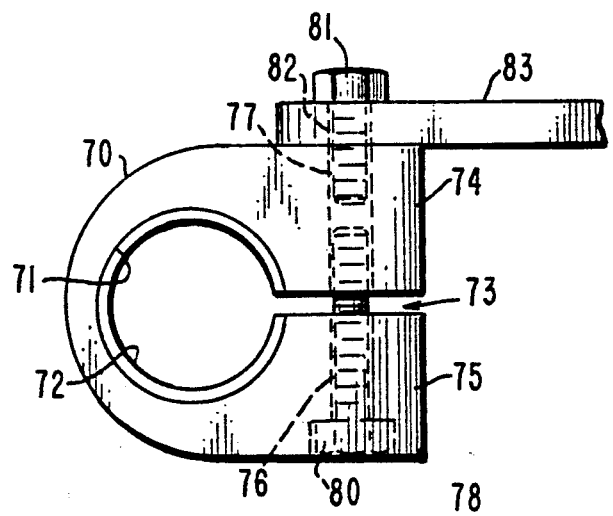
FIG. 10 is the ball socket member of FIG. 8 showing two screws and an arm fastened thereto.

FIGS. 8, 9 and 10 show another embodiment of a ball socket member 70 that may be used in place of the ball socket member 65 in the ball and socket assembly shown in FIGS. 6 and 7. The ball socket member 70 is provided with a cylindrical ball socket 71 having a smaller diameter shoulder or ledge 72 at the bottom. The ball socket member 70 is provided with a split 73 dividing it into a first finger 74 and a second finger 75. A screw hole 76 passes completely through both fingers 74, 75 of the ball socket member 70. The hole 76 is provided with screw threads 77 in the first finger 74, and is drilled out to a screw clearance size in the second finger 75. A counterbore 78 is provided in the second finger 75. The counterbore 78 serves as a recess for a cap screw 80 that is used to draw the two fingers 74, 75 together. A second screw 81 is threaded into the same hole 76 from the opposite direction and passes through a clearance hole 82 in an arm 83. The arm 83 is shown broken away in FIG. 10 but may be similar to the arm 34 in FIGS. 3 and 4. The two screws 80, 81 may be tightened or loosened independently in the screw threads 77. The ball socket member 70 may be slipped over a pivot ball such as the ball 60 in FIGS. 6 and 7 and clamped together by tightening the cap screw 80. Because of the smaller diameter shoulder or ledge 72, the ball 60 is held captive, although the cap screw 80 may be loosened slightly to avoid binding. Typically, the ball socket 71 is bored out to 0.625 inches, and the shoulder or ledge 72 is bored out to 0.610 inches. The screw threads 77 are typically ¼—20, while the clearance hole 76 in the second finger 75 is 0.257 inches. The counterbore 78 may be 0.375 inches diameter, and 0.260 inches deep.

Figure 11:
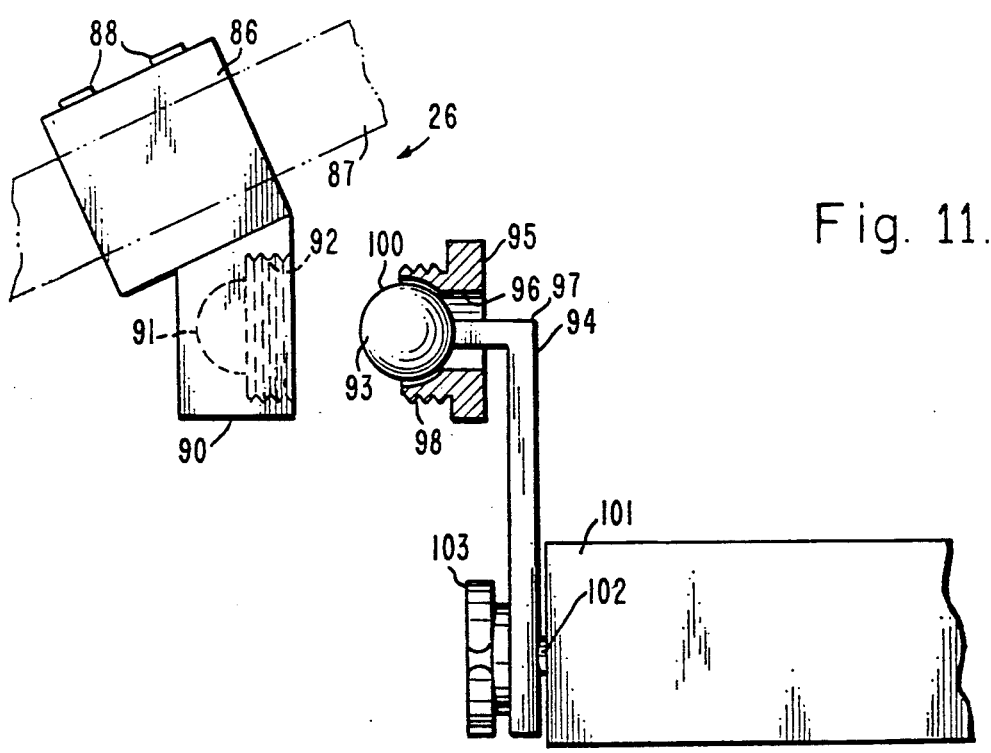
FIG. 11 is a top view of a captive ball embodiment of a mounting arrangement for a mirror.

Referring now to FIG. 11, there is shown a captive ball embodiment of the mounting arrangement 26. A clamp 86 mounts to a windshield frame 87 (shown in phantom and broken away) by means of set screws 88. The clamp 86 has a protruding member 90 having a recess 91 with a full hemispherical radius in the bottom. The outer part of the recess 91 is an inset straight bore tapped with internal screw threads 92. The radius in the recess 91 matches the radius of a mating ball 93 that is attached to a swinging arm 94. If desired, the swinging arm 94 and the ball may be molded of one integral piece of a hard plastic such as polycarbonate. A nut 95 has an opening 96 through which passes an elbow 97 of the swinging arm 94. The nut 95 is provided with external threads 98 that are adapted to be screwed into the internal screw threads 92 in the protruding member 90. The nut 95 is provided with a partial radius 100 that matches the radius of the ball 93. The opening 96 has a large diameter so as to accommodate the elbow 97 when the swinging arm 94 is being pivoted or adjusted. The protruding member 90 is at an angle to the clamp 86 to reduce the amount of movement that the swinging arm 94 must make. Typically, this angle is on the order of 15°, although it may be made larger or smaller, as required. An angle of 15° will usually accommodate the majority of windshield designs. The swinging arm 94 is provided with a slot that enables it to be fastened to one side of a mirror 101 by means of a stud 102 and a nut 103 that come with the mirror 101. It will be understood that a second captive ball assembly mounts the other side of the mirror 101 to the windshield frame 87.

Figure 12:
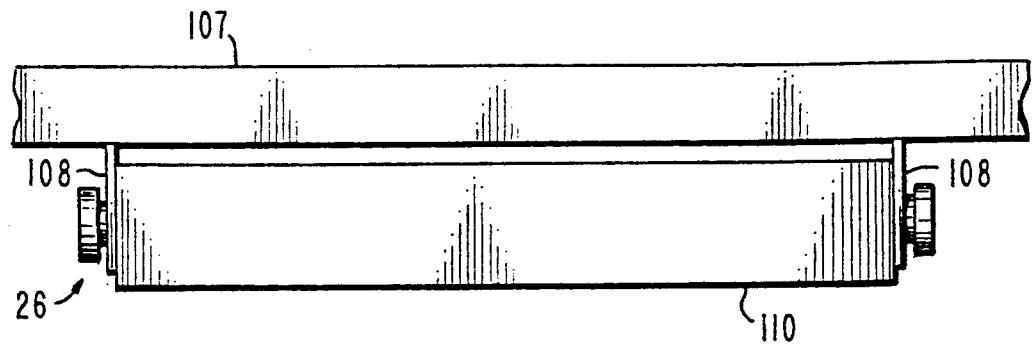
FIG. 12 is a top view of an integral mirror mounting arrangement integrated into a windshield frame.
Figure 13:
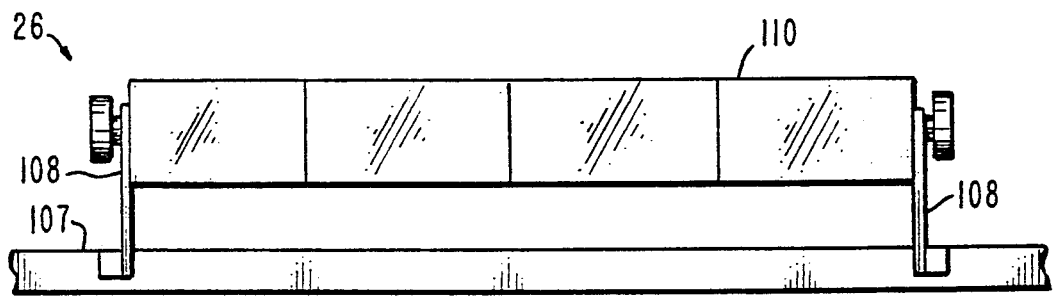
FIG. 13 is front elevation view of the integral mirror mounting arrangement of FIG. 12.
Figure 14:
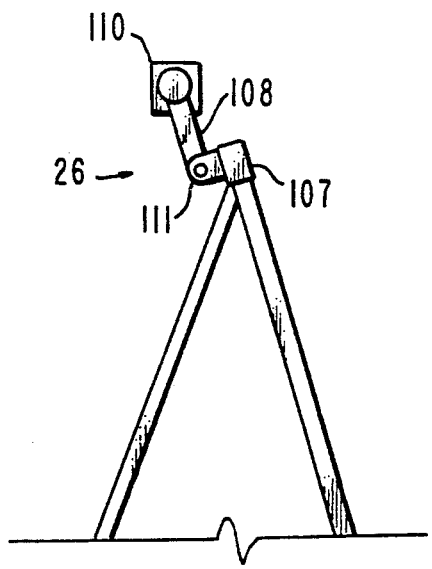
FIG. 14 is a side elevation view of the integral mirror mounting arrangement of FIGS. 12 and 13.

Referring now to FIGS. 12, 13 and 14, the mounting arrangement 26 may be made integral with the windshield 107, if desired. FIG. 12 is a top view of an integral member 108 made in accordance with the principles of the present invention, FIG. 13 is a front view of the integral member 108, and FIG. 14 is a side view of the integral member 108. A mirror 110 is supported by an integral member 108 fastened to each side thereof. The integral member 108 is provided with a pivot 111 to permit folding the mirror 110 down for covering or trailering. The integral members 108 are incorporated into the design of the windshield 107. The integral members 108 may be bolted directly to the frame of the windshield 107 or, alternatively, they may be molded into the frame of the windshield 107 as a standard accessory. In this manner, the necessity to use a bracket or U-shaped clamp to fasten the mirror 110 to the frame of the windshield 107 is eliminated.

Figure 15:
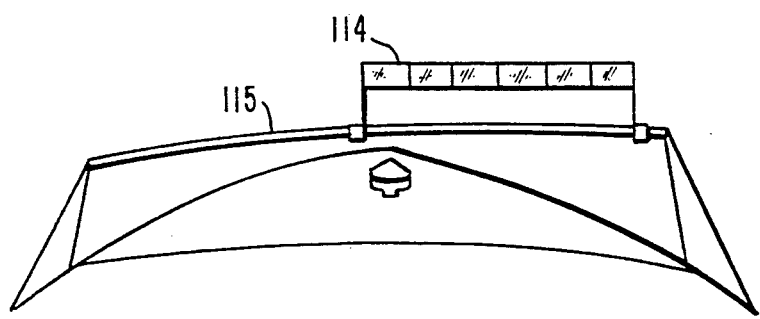
FIG. 15 is a perspective view of a mirror mounted above a conventional boat windshield.
Figure 16:
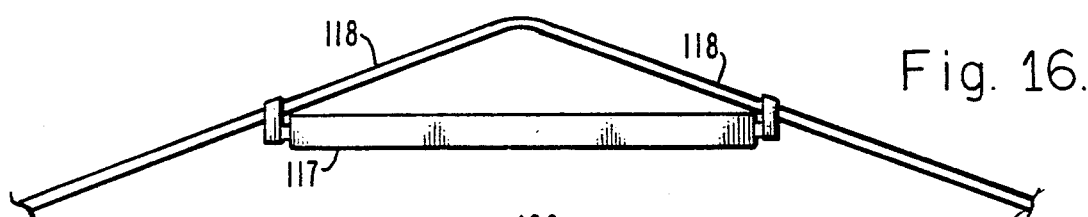
FIG. 16 is a top view of a mirror mounted to an angled boat windshield.
Figure 17:
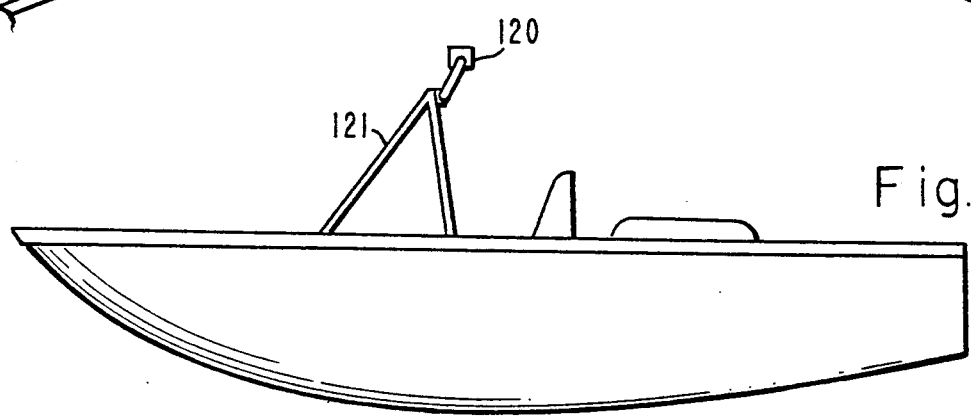
FIG. 17 is a side view of a mirror mounted above a boat windshield.

FIG. 15 is a front view of a mirror 114 fastened to a straight windshield 115 illustrating how the mirror 114 is raised in the air above the windshield 115 to provide unobstructed vision behind the boat. FIG. 16 is a top view of a mirror 117 adapted to mount on two windshields 118 joined at an angle. The mirror 117 extends along the hypotenuse from one windshield 118 to the other windshield 118. FIG. 17 is a side view of a mirror 120 mounted above a windshield 121 indicating how the mirror 120 can be adapted to extend toward the rear almost over the head of the driver.

Figure 18:
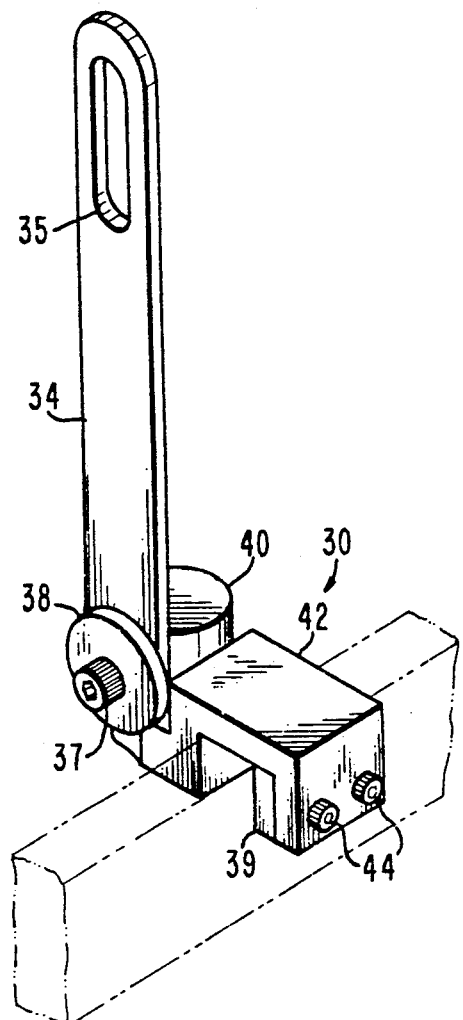
FIG. 18 is a perspective view of a modification of the mounting arrangement shown in FIG. 3.
Figure 19:
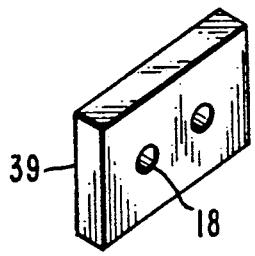
FIG. 19 is a perspective view of a plate used in the modification of FIG. 18.

FIG. 18 is a perspective view of a modification to the mounting arrangement of FIG. 3. The U-shaped mounting bracket or clamp 42 that clamps to the windshield frame member 43 is modified by the insertion of a plate 39 in the clamping region. FIG. 19 is a perspective view of the plate 39. One broad surface of the plate 39 is provided with two dimples or depressions 18 to receive the ends of the set screws 44. The dimples, or depressions 18 are shallow counterbores, and do not pass all the way through the plate 39. The plate 39 provides an even distribution of the clamping forces, and different windshield thickness may be accommodated by making the plate 39 of different thicknesses. A knurled thumb knob may be employed in place of the cap screw 37, if desired.

Figure 20:
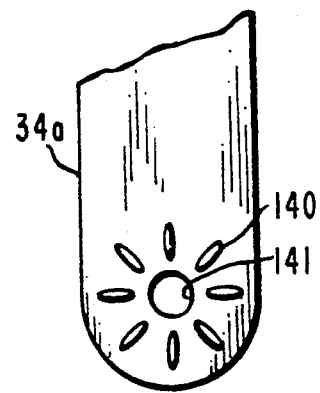
FIG. 20 is a view of a portion of an arm that may be suitable for use in the mounting arrangement of FIG. 18, the arm being provided with locking means.
Figure 21:
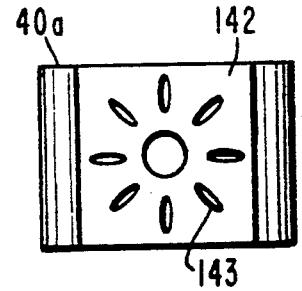
FIG. 21 is a view of the flat face of a cylindrical pivot that is provided with locking means that mates with the locking means on the arm of FIG. 20.

FIG. 20 shows an arm 34a for use in the mounting arrangement of FIG. 18, the arm 34a being provided with a plurality of elongated depressions 140 disposed radially around a screw hole 141 provided for the cap screw 37. Eight radial depressions 140 may be provided spaced every 45° around the screw hole 141. Referring now to FIG. 21, a cylindrical pivot 40a has a flat surface 142 provided with eight elongated radial projections 143. These radial projections 143 are adapted to mate with the radial depressions 140 in the arm 34a to provide a locking mechanism that will not vibrate loose.

Figure 22:
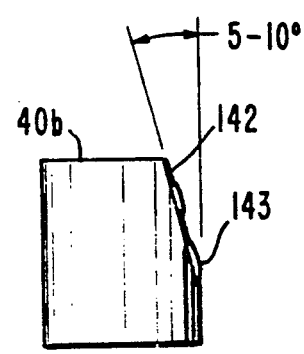
FIG. 22 is a side view of the flat face of a cylindrical pivot that has been machined at an angle to match the configuration of a particular boat windshield.

FIG. 22 is a side view of the flat face 142 of a different embodiment of the cylindrical pivot 40b. This pivot 40b is provided with the radial projections 143 shown in FIG. 21, and with a machined angle that may be on the order of 5 to 10 degrees. The cylindrical pivot 40b having the flat face 142 at an angle is better adapted to mount to the windshield of certain boats.

Figure 23:
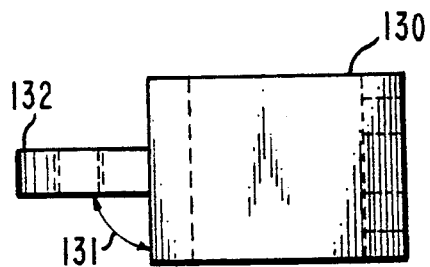
FIG. 23 is a top view of a clamp having a simple up-down pivot.
Figure 24:
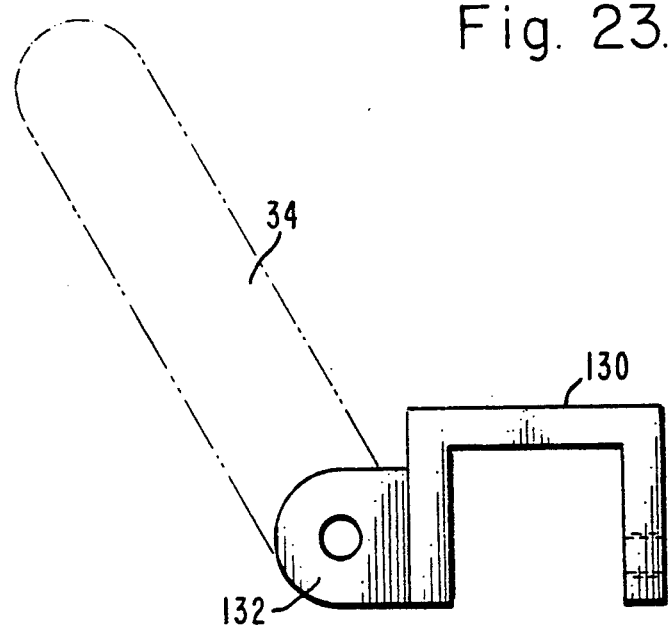
FIG. 24 is a side view of the clamp of FIG. 21.
Figure 25:
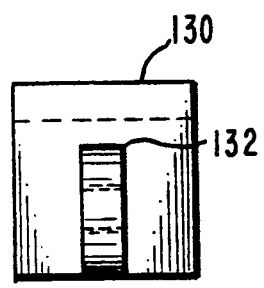
FIG. 25 is a front view of the clamp of FIGS. 21 and 22.

FIGS. 23, 24 and 25 show three different views of a modified U-shaped mounting bracket or clamp 130. This modified clamp 130 does not have a universal-type swivel. Instead, the arm 34 only pivots in one plane for raising and lowering the mirror. The angle 131 between the body of the clamp 130 and a protruding pivot member 132 is chosen or selected to match the angle of a particular windshield.

Thus, there has been described several embodiments of a rear view mirror mounting arrangement for boats that provides an unobstructed panoramic view of a water skier being towed behind a speedboat. The several embodiments described result in the mirror being adaptable to various windshield shapes and being adaptable to pivot up and down. This latter feature permits covering and trailering of the boat. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Apparatus adapted for mounting a mirror above a boat windshield in a manner such that the mirror may be pivoted down when not in use, said apparatus comprising:
    first and second mirror mounts, said first mirror mount adapted to be fastened at one end of an elongated mirror, said second mirror mount adapted to be fastened at the other end of said elongated mirror;
    said mirror mounts each having a clamp member for attachment to a boat windshield;
    said mirror mounts each having a slotted elongated arm for varying the distance of said mirror from said clamp members;
    said mirror mounts each having a pivoting arrangement adapted for raising and lowering said mirror;
    said pivoting arrangement comprising a protruding member on said clamp member having a recess with a full hemispherical radius at the bottom;
    said protruding member having as an outer part of said recess an inset straight bore tapped with internal screw threads;
    a ball for mating with said recess having a radius matching the radius at the bottom of said recess;
    a nut having external threads adapted to engage the internal threads in said recess and having a partial radius that matches the radius of said ball, said nut having a large diameter opening; and
    an elbow attached at one end to said ball and adapted to pass through said large diameter opening in said nut and adapted to attach at the other end to one end of said slotted elongated arm.

2. Apparatus adapted for mounting a mirror above a boat windshield in a manner such that the mirror may be pivoted down when not in use, said apparatus comprising:
    first and second mirror mounts, said first mirror mount adapted to be fastened at one end of an elongated mirror, said second mirror mount adapted to be fastened at the other end of said elongated mirror;
    said mirror mounts each having a clamp member for attachment to a boat windshield;
    said mirror mounts each having a slotted elongated arm for varying the distance of said mirror from said clamp members;
    said mirror mounts each having a pivoting arrangement adapted for raising and lowering said mirror;
    said pivoting arrangement comprising a protruding member on said clamp member having a ball mounted thereto;
    a ball socket member having a cylindrical ball socket adapted to mate with said ball, said cylindrical ball socket having a ledge at one end thereof adapted to engage said ball, said ball socket member having a split dividing it into a first finger and a second finger, said ball socket member having a screw hole passing through said first and second fingers, said hole having screw threads in said first finger and having a clearance diameter in said second finger;
    a first screw for fastening said slotted elongated arm to said first finger; and
    a second screw for drawing said first and second fingers together.

3. Apparatus adapted for mounting a mirror above a boat windshield in a manner such that the mirror may be pivoted down when not in use, said apparatus comprising:

first and second mirror mounts, said first mirror mount adapted to be fastened to one end of an elongated mirror, said second mirror mount adapted to be fastened at the other end of said elongated mirror;

said mirror mounts each having a clamp member for attachment to a boat windshield;

said mirror mounts each having a slotted elongated arm for varying the distance of said mirror from said clamp members;

said mirror mounts each having a pivoting arrangement adapted for raising and lowering said mirror;

said pivoting arrangement comprising a protruding member on said clamp member having a ball mounted thereto;

a ball socket member having a cylindrical ball socket adapted to mate with said ball, said ball socket member having a split dividing it into a first finger and a second finger, said ball socket member having a screw hole passing through said first and second fingers, said hole having screw threads in said first finger and having a clearance diameter in said second finger; and a screw for fastening said slotted elongated arm to said second finger and for drawing said first and second fingers together.

4. Apparatus adapted for mounting a mirror above a boat windshield in a manner such that the mirror may be pivoted down when not in use, said apparatus comprising:

first and second mirror mounts, said first mirror mount adapted to be fastened at one end of an elongated mirror, said second mirror mount adapted to be fastened at the other end of said elongated mirror;

said mirror mounts each having a clamp member for attachment to a boat windshield;

said mirror mounts each having a slotted elongated arm for varying the distance of said mirror from said clamp members;

said mirror mounts each having a pivoting arrangement adapted for raising and lowering said mirror;

said pivoting arrangement comprising a protruding member on said clamp member having a counterbored screw clearance hole therein;

a cylindrical member having a truncating flat on one side and having a first threaded screw hole in said flat, and having a second threaded screw hole in one end thereof;

a first screw disposed in the counterbored screw clearance hole in said protruding member and having its threads engaged in said second threaded screw hole in said cylindrical member; and a second screw fastening said slotted elongated arm to the flat on said cylindrical member by having its threads engaged in said first threaded screw hole in said cylindrical member.

5. Integral mirror mounts incorporated into the frame of a boat windshield, said mirror mounts comprising:

a frame for a boat windshield having an upper frame member;

first and second integrated mirror mounting tabs protruding from the upper frame member of said boat windshield;

a pivoting arrangement disposed on and fastened to said integral mirror mounting tabs; and a slotted elongated arm pivotably attached at one end to said pivoting arrangement, the other end of said slotted elongated arm adapted to be attached to one end of an elongated mirror;

whereby a mirror may be mounted above the windshield in a manner such that the mirror may be pivoted down when not in use, and whereby the distance between the mirror and said pivoting arrangement may be varied.

* * * * *